(12) United States Patent
Ive et al.

(10) Patent No.: US 12,391,119 B2
(45) Date of Patent: Aug. 19, 2025

(54) VEHICLE CONTROL PANEL

(71) Applicant: FERRARI S.P.A., Modena (IT)

(72) Inventors: Jonathan P. Ive, San Francisco, CA (US); Eugene Whang, San Francisco, CA (US); Jeremy Bataillou, San Francisco, CA (US); Anthony Ashcroft, San Francisco, CA (US); Suhang Zhou, San Francisco, CA (US); Benoit Louzaouen, San Francisco, CA (US); Jemima Kiss, San Francisco, CA (US); Christopher Wilson, San Francisco, CA (US); Wan Si Wan, San Francisco, CA (US); Biotz Natera, San Francisco, CA (US); James McGrath, San Francisco, CA (US); Roger Guyett, San Francisco, CA (US); Joseph Luxton, San Francisco, CA (US); Michael Matas, San Francisco, CA (US); Patrick Kessler, San Francisco, CA (US); Benedetto Vigna, Modena (IT); Maximilian Romani, Modena (IT); Vito Conigliaro, Modena (IT); Matteo Lanzavecchia, Modena (IT)

(73) Assignee: FERRARI S.P.A., Modena (IT)

( * ) Notice: Subject to any disclaimer, the term of this patent is extended or adjusted under 35 U.S.C. 154(b) by 147 days.

(21) Appl. No.: 18/499,477

(22) Filed: Nov. 1, 2023

(65) Prior Publication Data
US 2024/0149685 A1    May 9, 2024

(30) Foreign Application Priority Data
Nov. 4, 2022  (IT) .......................... 102022000022758

(51) Int. Cl.
*B60K 35/00*  (2024.01)
*B60K 35/50*  (2024.01)
(Continued)

(52) U.S. Cl.
CPC .............. *B60K 35/50* (2024.01); *B60K 35/00* (2013.01); *B60K 35/60* (2024.01); *B60K 35/215* (2024.01);
(Continued)

(58) Field of Classification Search
CPC ........ B60K 35/50; B60K 35/00; B60K 35/60; B60K 35/215; B60K 35/22; B60K 37/20;
(Continued)

(56) References Cited

U.S. PATENT DOCUMENTS

| 4,777,480 A | * | 10/1988 | Okamoto | ............... | G01D 11/28 340/688 |
| 7,731,374 B2 | * | 6/2010 | Takato | ................... | B60K 35/60 362/489 |

(Continued)

FOREIGN PATENT DOCUMENTS

| DE | 112006002922 T5 | 10/2008 |
| EP | 3138722 B1 | 8/2018 |
| JP | 2021012059 A | 2/2021 |

OTHER PUBLICATIONS

Italian Search Report for Application No. 202200022758; Filing Date: Nov. 4, 2022; Date of Mailing: May 8, 2023; 7 pages.

*Primary Examiner* — Richard M Camby
(74) *Attorney, Agent, or Firm* — CANTOR COLBURN LLP (57) ABSTRACT

A control panel for a vehicle and having: a main digital screen having at least one through opening made within it and completely surrounded by the main digital screen; a secondary digital screen, which is arranged behind the main (Continued)

digital screen in the area of the through opening of the main digital screen so that it is visible through the through opening; a pointer, which can be arranged between the main digital screen and the secondary digital screen and is mounted in a movable manner so as to move on the secondary digital screen; and an actuator device configured to move the pointer on the secondary digital screen.

27 Claims, 9 Drawing Sheets

(51) Int. Cl.
*B60K 35/60* (2024.01)
*B60K 35/215* (2024.01)
*B60K 35/22* (2024.01)
*B60K 37/20* (2024.01)

(52) U.S. Cl.
CPC .............. *B60K 35/22* (2024.01); *B60K 37/20* (2024.01); *B60K 2360/698* (2024.01); *B60K 2360/96* (2024.01)

(58) Field of Classification Search
CPC .......... B60K 2360/698; B60K 2360/96; B60K 2360/6985; B60K 35/211; B60K 2360/1523; B60K 2360/336; B60K 2360/682; B60K 2360/693
See application file for complete search history.

(56) References Cited

U.S. PATENT DOCUMENTS

| | | | |
|---|---|---|---|
| 10,953,748 B2* | 3/2021 | Liburdi | G06F 3/1423 |
| 2013/0174773 A1* | 7/2013 | Nagara | B60K 35/22 |
| | | | 116/201 |
| 2014/0000508 A1* | 1/2014 | Liburdi | G01D 13/04 |
| | | | 116/284 |
| 2014/0147087 A1 | 5/2014 | Lambert et al. | |
| 2016/0196800 A1* | 7/2016 | Kim | G06F 3/0481 |
| | | | 715/788 |
| 2017/0192531 A1* | 7/2017 | Sanchez Lopez | B60K 35/215 |
| 2017/0253178 A1 | 9/2017 | Tane et al. | |
| 2018/0065483 A1* | 3/2018 | Liburdi | G09G 3/003 |

\* cited by examiner

VEHICLE CONTROL PANEL

CROSS-REFERENCE TO RELATED APPLICATIONS

This patent application claims priority from Italian patent application no. 102022000022758 filed on Nov. 4, 2022, the entire disclosure of which is incorporated herein by reference.

TECHNICAL FIELD

The present invention relates to a vehicle control panel.

The present invention advantageously applies to a car control panel, to which the following description will make explicit reference without thereby losing generality.

PRIOR ART

A car includes a dashboard, which forms the front wall of the driver and passenger compartment located beneath the windscreen. The dashboard supports a control panel, which is arranged in front of the driver immediately behind the steering wheel.

In the past, the control panel only included analogue instruments with pointers and a few warning lights; small digital screens gradually appeared, which over time became increasingly larger and more defined to show increasingly complex images until they became fully programmable. In the beginning, digital screens replaced the mileometer and some of the warning lights, subsequently they replaced the secondary analogue instruments (such as for example the residual fuel indicator and the clock), and eventually in some cases they also replaced the main analogue instruments (i.e. the speedometer and the rev counter) forming a fully digital instrumentation.

The fully digital instrumentation is usually very appreciated at "cruising" speed (especially in cities) because, being fully programmable, it allows useful driving information to be highlighted (for instance the speed of the vehicle which is an indispensable information for compliance with the limits set by the law and the navigator) so that the useful driving information can be read easily and immediately without having to overly distract the eye from the road. However, fully digital instrumentation is generally less appreciated in "sporty" driving, particularly in on-track driving, as it is deemed to be less immediately readable (i.e., it requires greater attention to acquire the information displayed by the instrumentation as a "quick glance" is not generally sufficient).

In high-performance sports cars currently in production, a compromise is normally reached which provides for the presence of a single analogue instrument that indicates the engine revolutions (i.e. a rev counter) flanked by one or two digital screens; however, this solution is a compromise that generally penalizes both the analogue instrument (which cannot be very large so as not to take away too much room needed for the digital screens), and the digital screens (which necessarily have relatively small dimensions so as not to overlap with the analogue instrument and, therefore, are not well suited to display a detailed chart navigator that instead is highly appreciated especially in city driving).

Patent EP3138722B1 describes a control panel comprising a digital screen and an analogue instrument provided with a circular support element and a pointer that moves within the support element; the analogue instrument is movable so as to be placed only when required in a working position, in which the analogue instrument overlaps the digital screen so that the support element of the analogue instrument covers a corresponding part of the digital screen itself.

Patent application US20170253178A1 describes a display device for a vehicle and comprising a liquid crystal panel which provides a display surface, where an image is displayed, and a backlight which emits light on the liquid crystal panel from behind, a real object placed between the liquid crystal panel and the backlight and visible through the liquid crystal panel, and a controller which controls the liquid crystal panel so that a specific pixel region of the display surface behind which the real object is placed has a higher light transmittance than another pixel region of the display surface.

DESCRIPTION OF THE INVENTION

The object of the present invention is to provide a vehicle control panel, which allows information to be displayed so that the driver can, in all driving situations, capture the data he/she needs with the least amount of distraction.

According to the present invention, a vehicle control panel is provided, as claimed in the appended claims.

The claims describe preferred embodiments of the present invention forming an integral part of the present specification.

BRIEF DESCRIPTION OF THE DRAWINGS

The present invention will now be described with reference to the accompanying drawings, which illustrate some non-limiting embodiments thereof, in which.

PREFERRED EMBODIMENTS OF THE INVENTION

Figure 1:
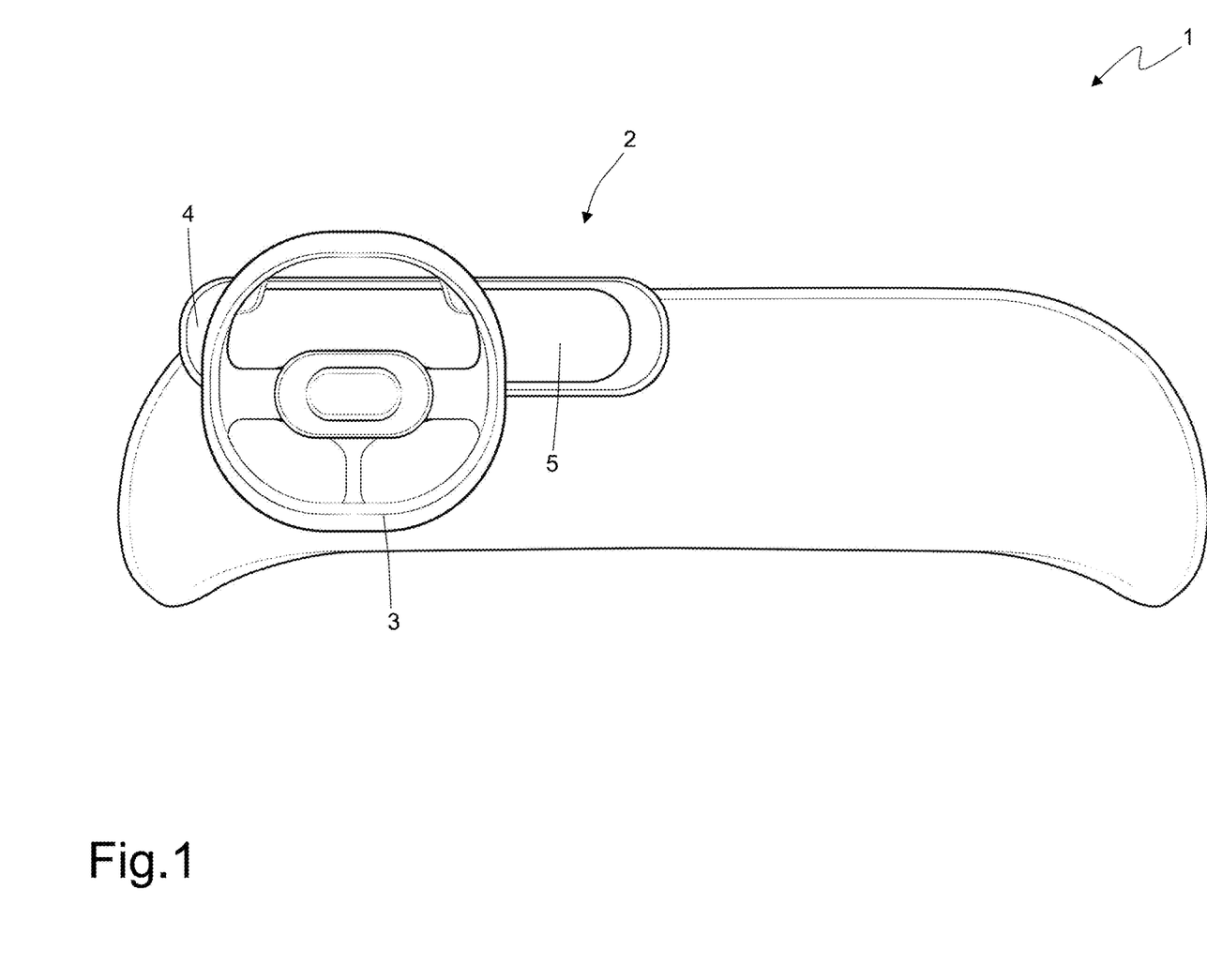
FIG. 1 is a schematic view of part of a car dashboard provided with a control panel made in accordance with the present invention.

Number 1 in FIG. 1 indicates, as a whole, a car dashboard.

The dashboard 1 supports a control panel 2, which is arranged in front of the driver behind a steering wheel 3. In particular, the control panel 2 is arranged above a support body which houses, on the inside, the steering shaft (i.e., the element at one end of which the steering wheel 3 is mounted).

The control panel 2 comprises a box-shaped housing body 4, which is substantially parallelepiped in shape (with rounded edges) and shaped like a cup to contain, on the inside, all the components of the control panel 2; in particular, the housing body 4 has an open end, which faces the steering wheel 3 (i.e., towards the driver) and is closed by a main transparent panel 5 which reproduces the shape of the housing body 4 so as to engage the entire area of the housing body 4. According to a preferred embodiment, the housing body 4 comprises a connecting element, which protrudes in a cantilevered manner from a lower wall of the housing body 4 and is configured to attach the housing body 4 to the dashboard 1 of the vehicle; in particular, the connecting element is a ring that is fitted around a cylindrical support of the dashboard 1.

Figure 2:
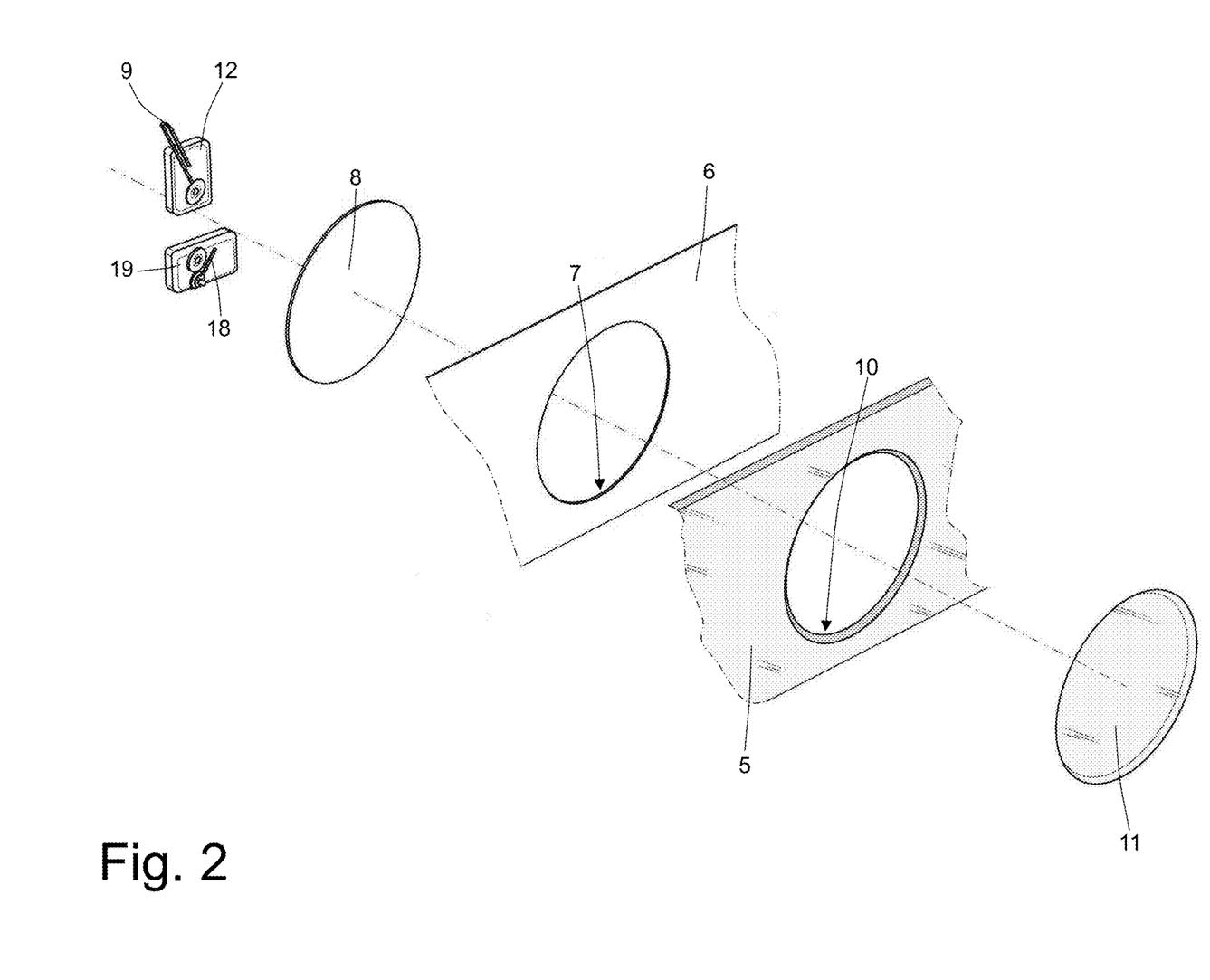
FIGS. 2 and 3 are two different partial, perspective and exploded views of the control panel.

As shown in FIG. 2, the control panel 2 comprises a main digital screen 6 (for example made with the LED or OLED technology), which is arranged in the housing body 4 below the main transparent panel 5 and reproduces the shape of the housing body 4 so as to engage the entire area of the housing body 4. The main digital screen 6 has at least one through opening 7, which is cut into the main digital screen 6 and completely surrounded by the main digital screen 6. Alternatively, one larger through opening 7 at the centre and two or more smaller through openings 7 at the sides may be present; that is, one through opening 7 arranged at the centre has a greater size than the sizes of the other two through openings 7 arranged at the ends, and the two through openings 7 arranged at the ends have the same size. As a further alternative, two (or more) larger through openings 7 arranged at the centre and a few smaller through openings 7 arranged at the sides (having different sizes) may be present.

According to a preferred embodiment shown in the attached figures, the through opening 7 cut through the main digital screen 6 has a circular (round) shape; in the case of three through openings 7, the radius of the through opening 7 arranged at the centre would preferably be larger than the radius of the two through openings 7 arranged at the ends. According to other embodiments, not shown, one or more through openings 7 cut through the main digital screen 6 have a different shape from the circular shape (e.g., a rectangular or elliptical shape).

As shown in FIG. 2, the control panel 2 comprises a secondary digital screen 8 (for example made with the LED or OLED technology), which is arranged behind the main digital screen 6 in the area of the through opening 7 of the main digital screen 6 so that it is visible through the through opening 7. Preferably, the secondary digital screen 8 has the same shape and the same size as the through opening 7 of the main digital screen 6, so that it completely engages the through opening 7 and does not protrude significantly beyond the through opening 7; in any case, the secondary digital screen 8 has a size that is not smaller than the size of the through opening 7, such as to completely close the empty space of the through opening 7.

The secondary digital screen 8 is arranged behind the main digital screen 6 (and at a short, yet non-null distance from the main digital screen 6), thus pointing out the step resulting from the through opening 7 of the main digital screen 6.

According to other embodiments, not shown, a different number of through openings 7 and, hence, of corresponding secondary digital screens 8 is provided (e.g., one secondary digital screen 8 or two, four or five secondary digital screens 8). According to other embodiments, not shown, the size, position or shape of the through openings 7 and, hence, of the secondary digital screens 8 may be different.

As shown in FIG. 2, the control panel 2 comprises a pointer 9 (which is arranged between the main digital screen 6 and the secondary digital screen 8; that is, the pointer 9 is located behind the main digital screen 6 (thus it is only visible through the through opening 7) and in front of the secondary digital screen 8 so as to overlap (when necessary) the secondary digital screen 8. In addition, the pointer 9 is mounted in a movable manner so as to move (when necessary) on the secondary digital screen 8 to indicate information displayed by the secondary digital screen 8. According to other embodiments, not shown, the number and arrangement of the pointers 9 could be different and, for example, two or more pointers 9 could be coupled to the same secondary digital screen 8.

According to a possible embodiment, not shown, the central secondary digital screen 8 is coupled to a single pointer 9, which is the only one cooperating with the central secondary digital screen 8, whereas each side secondary digital screen 8 is coupled to two pointers 9, which both cooperate with the same side secondary digital screen 8; the two pointers 9 cooperating together with the same side secondary digital screen 8 can be arranged aligned and facing each other to move together in a synchronized manner or can be moved independently of one another. Alternatively, each secondary digital screen 8 is coupled to a single pointer 9.

Figure 3:
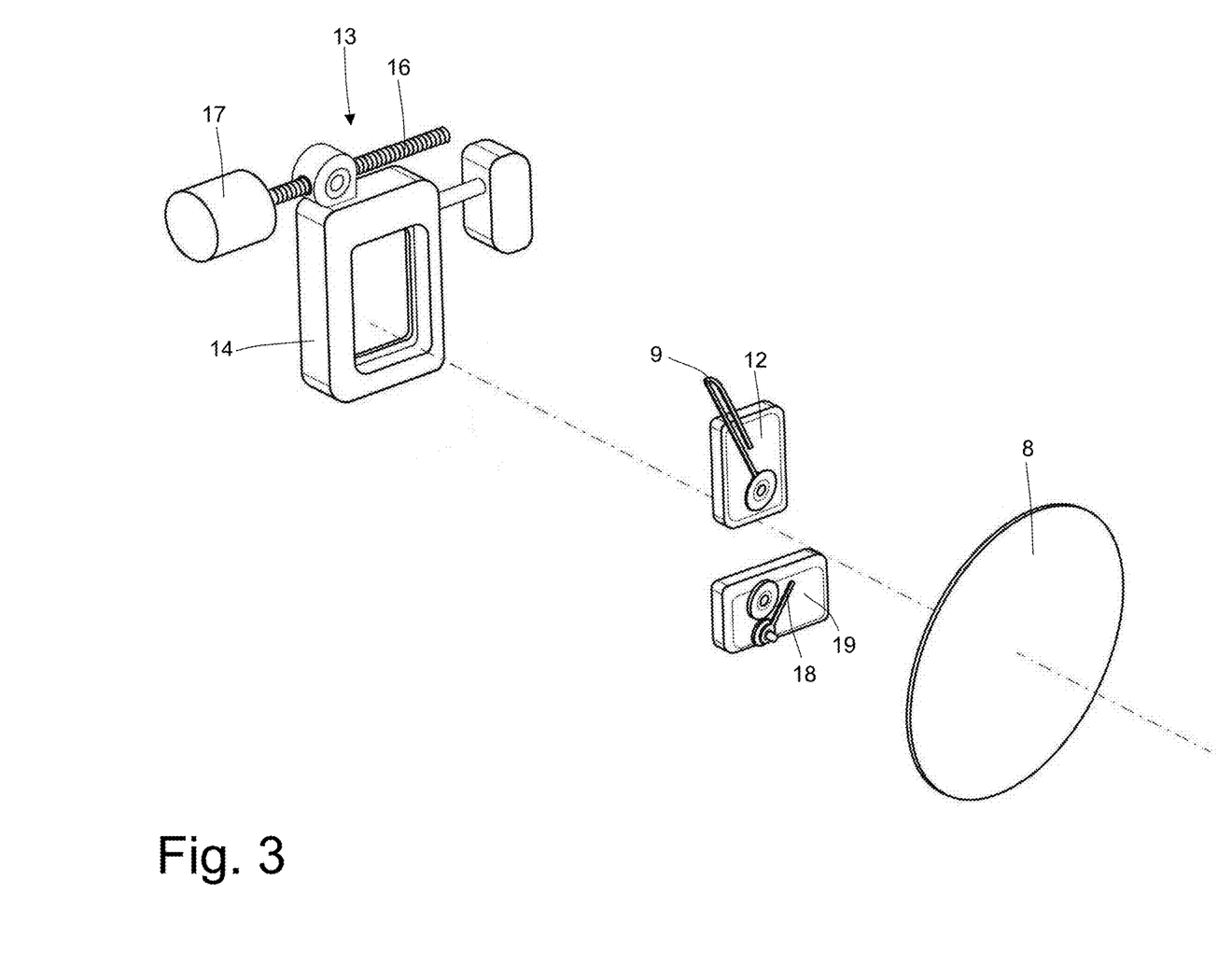
Figure 4:
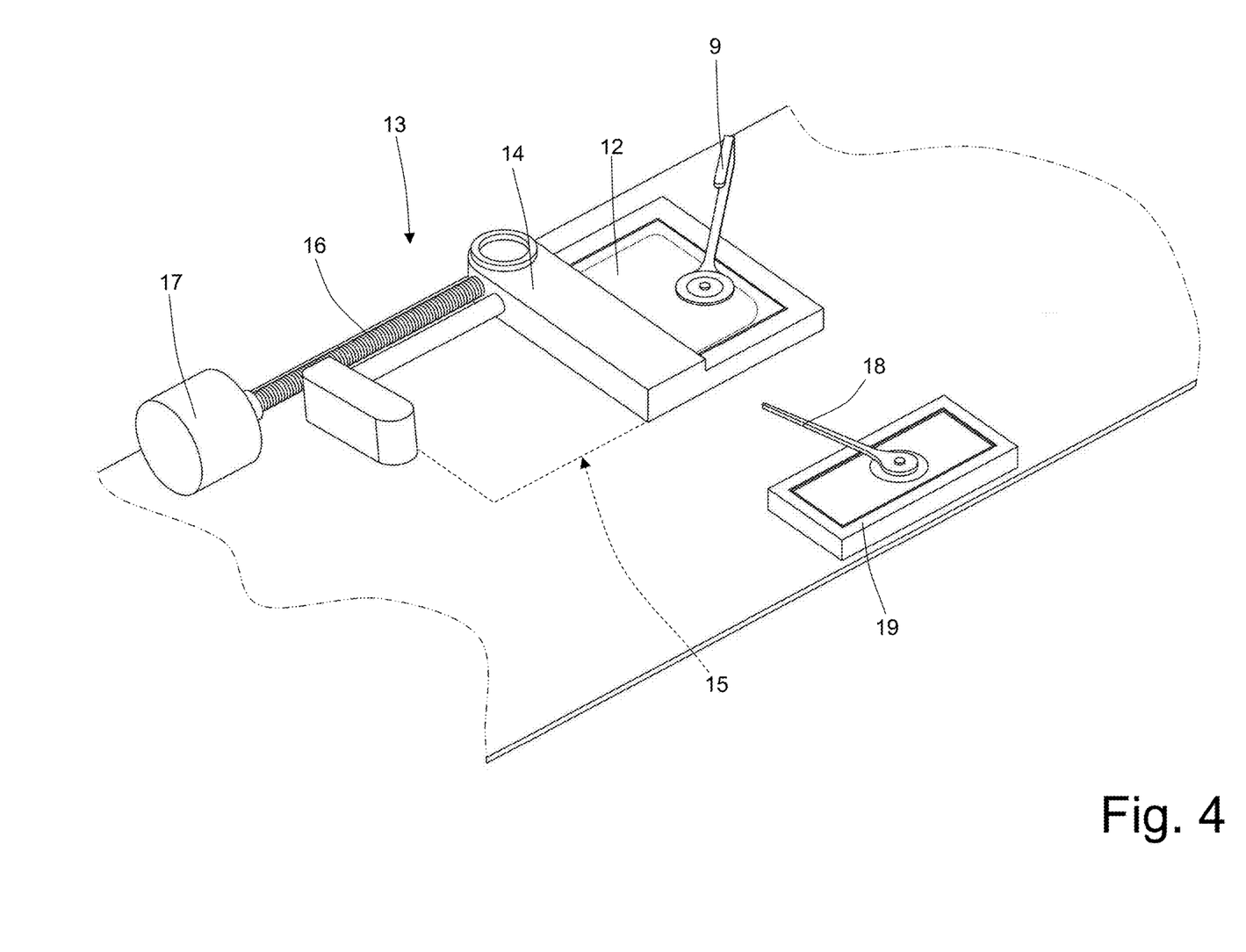
FIG. 4 is a partial, perspective view, with parts removed for clarity, of the control panel.

According to the embodiment shown in FIGS. 2, 3 and 4, the pointer 9 has a visible part (that is, it can overlap the respective secondary digital screen 8) extending from the edge of the secondary digital screen 8 towards the centre of the secondary digital screen 8; that is, the pointer 9 has a peripheral positioning since its visible part starts from the edge (from the periphery) of the secondary digital screen 8. In this embodiment, the pointer 9 is U-shaped and encloses the secondary digital screen 8 from the outside; i.e., the pointer 9 has a visible part that can be arranged in front of the secondary digital screen 8 and a hidden part that is always arranged behind the digital screen 8 and is connected by a U-curve to the visible part.

As shown in FIG. 2, the main transparent panel 5 covering the main digital screen 6 has a through opening 10 which is arranged in the area of the through opening 7 of the main digital screen 6 and has the same shape and the same size as the through opening 7 of the main digital screen 6 (alternatively, the through opening 10 may be larger than the through opening 7 of the main digital screen 6). The control panel 2 comprises a secondary transparent panel 11 which is arranged in the area of the through opening 10 of the main transparent panel 5 and covers the secondary digital screen 8. According to a preferred, non-limiting embodiment, the secondary transparent panel 11 is not coplanar with the main transparent panel 5 and is arranged further back than the main transparent panel 5 (i.e., further away from the driver than the main transparent panel 5); alternatively, the secondary transparent panel 11 is arranged further forward than the main transparent panel 5 (i.e., closer to the driver than the main transparent panel 5), or the secondary transparent panel 11 is coplanar with the main transparent panel 5.

According to a different embodiment, not shown, the main transparent panel 5 has no through opening 10 and seamlessly covers both the main digital screen 6 and the secondary digital screens 8.

As shown in FIGS. 2, 3 and 4, the control panel 2 comprises an actuator device 12 which is configured to move the pointer 9 (or the pointers 9) on the corresponding secondary digital screen 8. Preferably, the actuator device 12 directly supports the pointer 9 (or the pointers 9).

According to a preferred embodiment, the actuator device 12 is mounted in a movable manner so as to move between an operating position (shown in the attached figures), in which the pointer 9 overlaps the secondary digital screen 8 and, hence, is visible through the through opening 7 of the main digital screen 6, and a rest position, in which the pointer 9 is arranged beside the secondary digital screen 8

(i.e., it is arranged behind the main digital screen 6) so as not to be visible through the through opening 7 of the main digital screen 6. In other words, the movement of the actuator device 12 (which directly supports the pointer 9) allows the pointer 9 to overlap the secondary digital screen 8, to make the pointer 9 visible through the through opening 7 of the main digital screen 6, and alternatively allows the pointer 9 to hide behind the main digital screen 6 so that the pointer 9 is hidden from view (i.e., the pointer 9 is no longer visible through the through opening 7 of the main digital screen 6 as it is located beside and not upon the secondary digital screen 8 and therefore is located beside the through opening 7 and hidden from view by the main digital screen 6).

As better shown in FIGS. 3 and 4, the control panel 2 comprises an actuator device 13 which is configured to move the actuator device 12 between the operating position and the rest position. As shown in FIG. 4, the actuator device 12 is mounted on a slide 14 which slides along a fixed guide 15, and the actuator device 13 comprises a worm screw 16, which engages a threaded hole made in the slide 14, and an electric motor 17, which causes the rotation of the worm screw 16.

As better shown in FIG. 4, the control panel 2 comprises an additional pointer 18, which is arranged between the main digital screen 6 and the central secondary digital screen 8 and is mounted in a movable manner so as to move on the central secondary digital screen 8. The control panel 2 also comprises an actuator device 19 (shown in FIGS. 2, 3 and 4), which is configured to move the pointer 18 on the central secondary digital screen 8 and directly supports the pointer 18. Unlike the actuator device 12 (which is mounted in a movable manner inside the housing body 4), the actuator device 19 is mounted in a fixed position inside the housing body 4 and therefore never changes its position. As a result, two different pointers 9 and 18 actuated by corresponding actuator devices 12 and 19 (only one of which can translate) can move on the central secondary digital screen 8.

Figure 5:
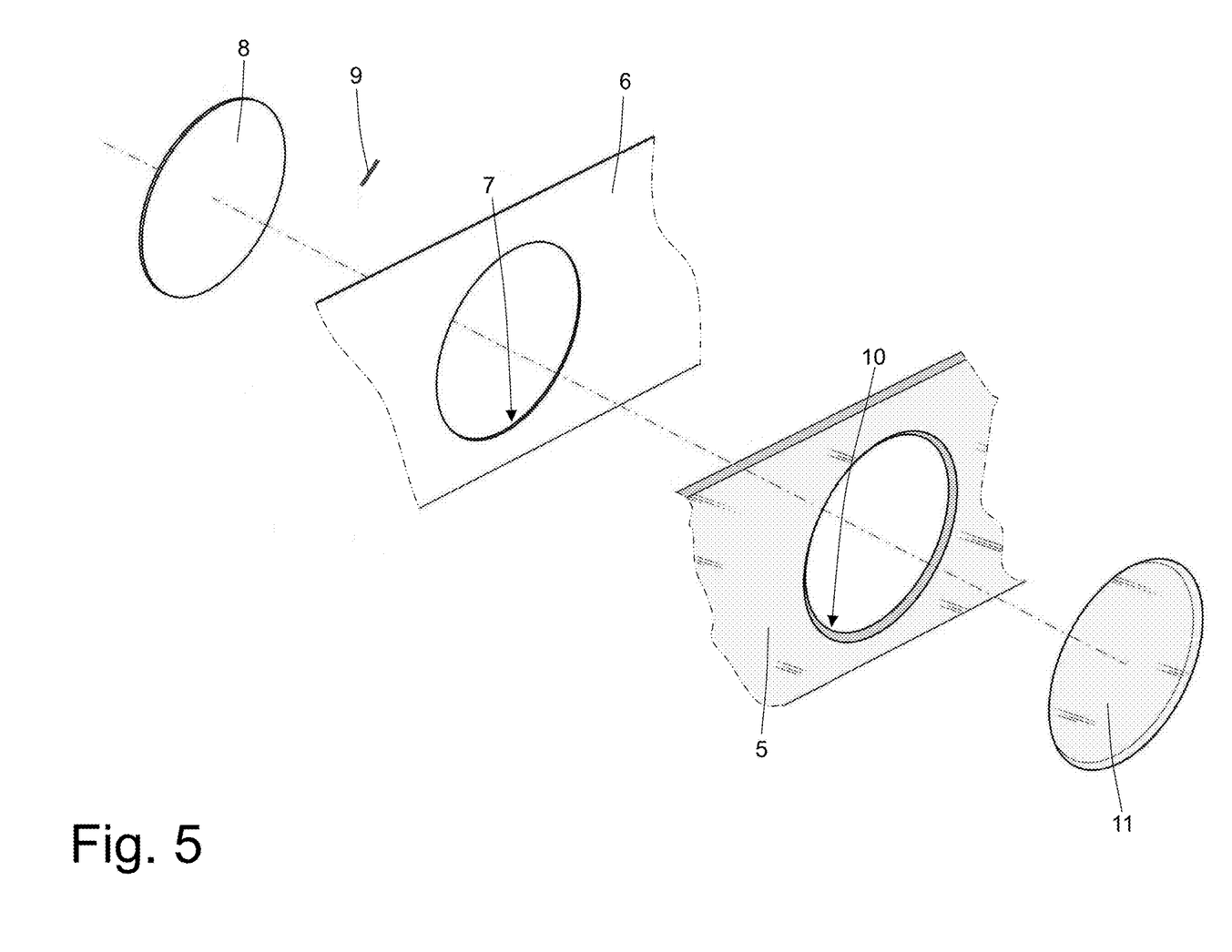
FIGS. 5 and 6 are two different partial, perspective and exploded views of a different embodiment of the control panel.
Figure 6:
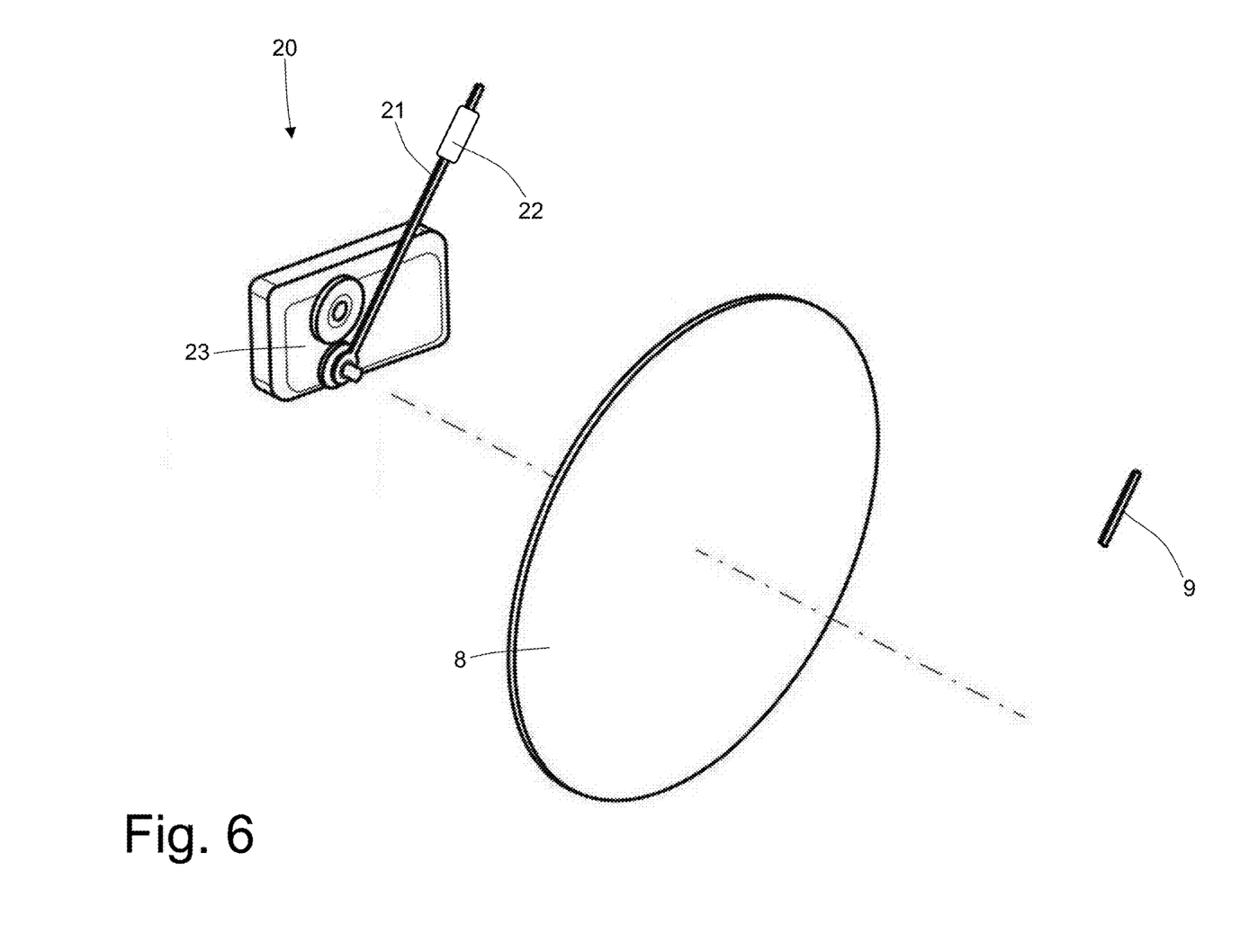

In the different embodiment shown in FIGS. 5 and 6, the pointer 9 is moved (both in the area of the through opening 7 of the main digital screen 6 so as to be visible through the through opening 7, and beside the through opening 7 so as not to be visible through the through opening 7) by an actuator device 20 that transmits motion to the pointer 9 through a contactless magnetic coupling. That is, the actuator device 20 has no component that is physically in contact with the pointer 9 and is only bound to the pointer 9 by means of a contactless magnetic coupling.

The actuator device 20 comprises a slider 21, which is arranged behind the secondary digital screen 8, is always aligned with the pointer 9 and magnetically attracts the pointer 9 to itself. In particular, the slider 21 supports a permanent magnet 22 which is designed to generate a relatively strong magnetic field so that the influence of the magnetic field also extends beyond the secondary digital screen 8 to magnetically attract the pointer 9. The secondary digital screen 8 is made so as to be unaffected by the magnetic field (i.e., so as not to be affected by the presence of the permanent magnet 22). The secondary digital screen 8 may also contain ferromagnetic material which allows the influence of the magnetic field to be increased beyond the secondary digital screen 8 (as it reduces the width of the air gap existing between the permanent magnet 22 and the pointer 9). The pointer 9 is obviously made of ferromagnetic material (to be magnetically attracted by the permanent magnet 22) and could also be magnetized with a polarity opposite to a polarity of the permanent magnet 22 to increase the magnetic attraction force between the permanent magnet 22 and the pointer 9.

According to a preferred embodiment, in the embodiment shown in FIGS. 5 and 6, the secondary digital screen 8 is slightly larger than the through opening 7, so that when the pointer 9 is arranged on the edge of the secondary digital screen 8 the pointer 9 is not visible through the through opening 7 (in fact, the pointer 9 cannot be moved beyond the secondary digital screen 8 as it must always remain on the secondary digital screen 8 to slide on the secondary digital screen 8).

According to a possible embodiment, a back surface of the pointer 9 that slides on the secondary digital screen 8 (and is pressed against the secondary digital screen 8 by the magnetic attraction force generated by the permanent magnet 22) may have a low friction outer layer (i.e., made of a material with a low friction coefficient).

The actuator device 20 comprises a motor 23 that moves the slider 21; in the embodiment shown in FIG. 6, the motor 23 only generates a rotary movement but alternatively the motor 23 may only generate a translation movement or a roto-translation movement.

In the different embodiment shown in FIGS. 7-10, the pointer 9 is moved (both in the area of the through opening 7 of the main digital screen 6 so as to be visible through the through opening 7, and beside the through opening 7 so as not to be visible through the through opening 7) by an actuator device 24 that transmits motion to the pointer 9 through a mechanical contact coupling. That is, the actuator device 24 is in physical contact with the pointer 9 and is bound to the pointer 9.

Figure 8:
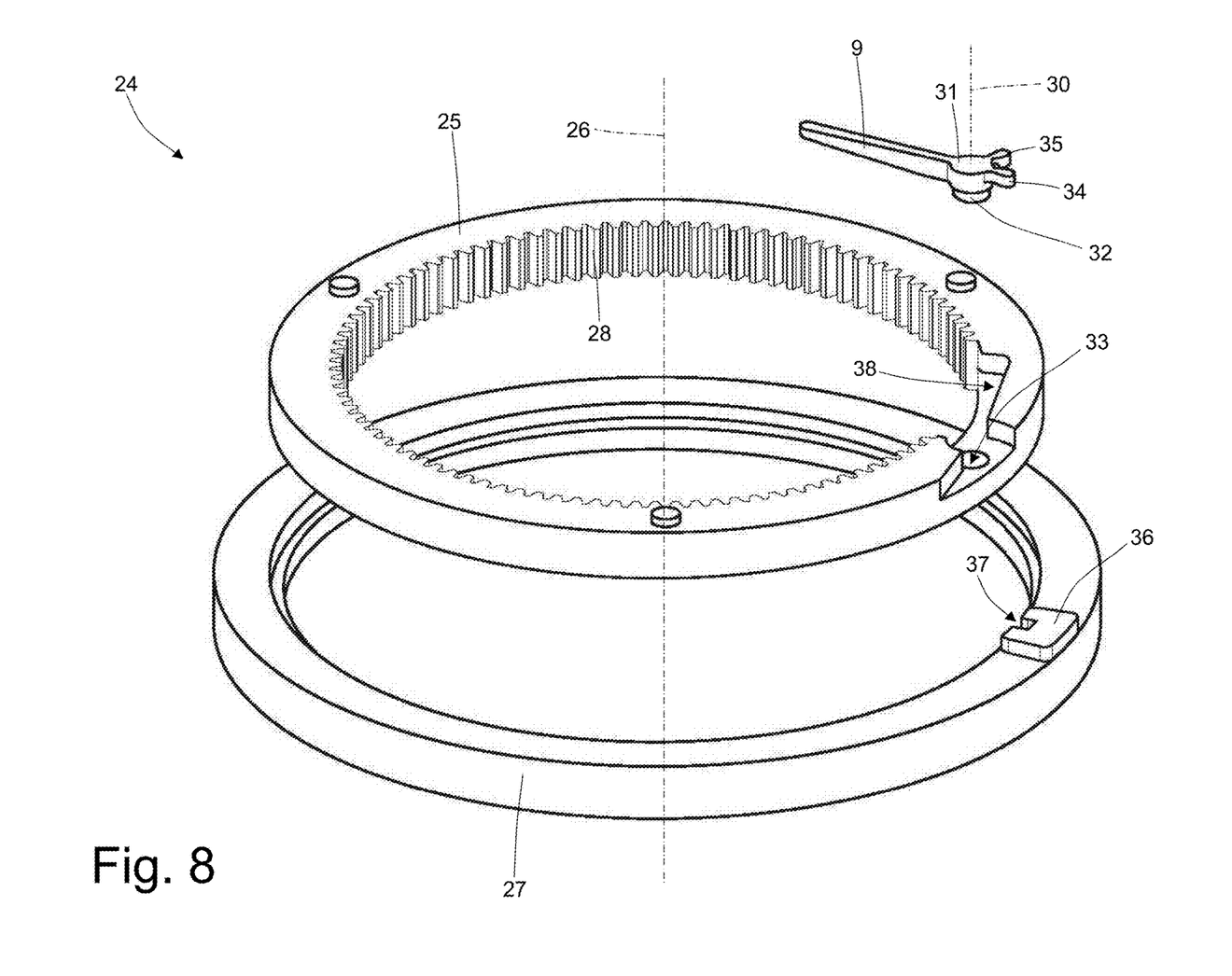
FIG. 8 is a perspective, exploded view of some components of the control panel in FIG. 7.

As better shown in FIG. 8, the actuator device 24 comprises a support ring 25, which is mounted so as to rotate around a central rotation axis 26 and supports the pointer 9: the rotation of the support ring 25 around the rotation axis 26 also causes the rotation of the pointer 9 around the rotation axis 26. The support ring 25 is arranged above (i.e., in an upper plane) the secondary digital screen 8 (i.e., it is arranged between the secondary digital screen 8 and the through opening 7 of the main digital screen 6) so that the pointer 9 carried by the support ring 25 can be arranged on the secondary digital screen 8 (i.e., it can overlap the secondary digital screen 8).

The support ring 25 has an inner diameter that is greater (larger) than an inner diameter of the through opening 7 of the main digital screen 6 so as not to be visible in any way through the through opening 7 and so as not to overlap the part of the secondary digital screen 8 visible through the through opening 7; in addition, preferably, the support ring 25 has an inner diameter that is greater (larger) than an outer diameter of the secondary digital screen 8 so as not to cover an edge of the secondary digital screen 8.

The support ring 25 is inserted inside a containing ring 27 which is fixed (i.e., it is attached to the housing body 4) and coaxial to the support ring 25 so that the support ring 25 is free to slide (i.e., to rotate around the rotation axis 26) relative to the containing ring 27. In other words, the containing ring 27 has, on the inside, an annular seat which slidably accommodates the support ring 25 to allow the support ring 25 to slide (i.e., to rotate around the rotation axis 26) relative to the containing ring 27.

According to a preferred embodiment, an annular rack 28 is present within the support ring 25 (i.e., at the inner surface of the support ring 25). The actuator device 24 comprises a motor 29 (shown in FIG. 7) which causes the rotation of a gear wheel meshing with the annular rack 28 so as to cause the rotation of the support ring 25 around the rotation axis 26 and relative to the containing ring 27 (i.e., inside the containing ring 27).

The pointer 9 is mounted on the support ring 25 so as to rotate, relative to the support ring 25, around a rotation axis 30 parallel to the rotation axis 26. In particular, a central element 31 is provided, which is mounted in a rotary manner on the support ring 25 and from which the pointer 9 radially protrudes in a cantilever fashion; underneath, the central element 31 has a circular pin 32 engaging a circular seat 33 of the support ring 25 to be free to rotate, within the seat 33 of the support ring 25, around the rotation axis 30. Two appendages 34 and 35, which are arranged on the opposite side relative to the pointer 9, radially protrude in a cantilever fashion from the central element 31. The containing ring 27 is fitted with a countering body 36, which axially protrudes from a top surface of the containing ring 27 and is arranged so as to hit against the appendages 34 and 35 during the rotation of the support ring 25 relative to the containing ring 27. Preferably, the countering body 36 has a cavity 37, which is open towards the centre (i.e., towards the rotation axis 26) and is shaped so as to contain, on the inside, the appendage 35.

Figure 9:
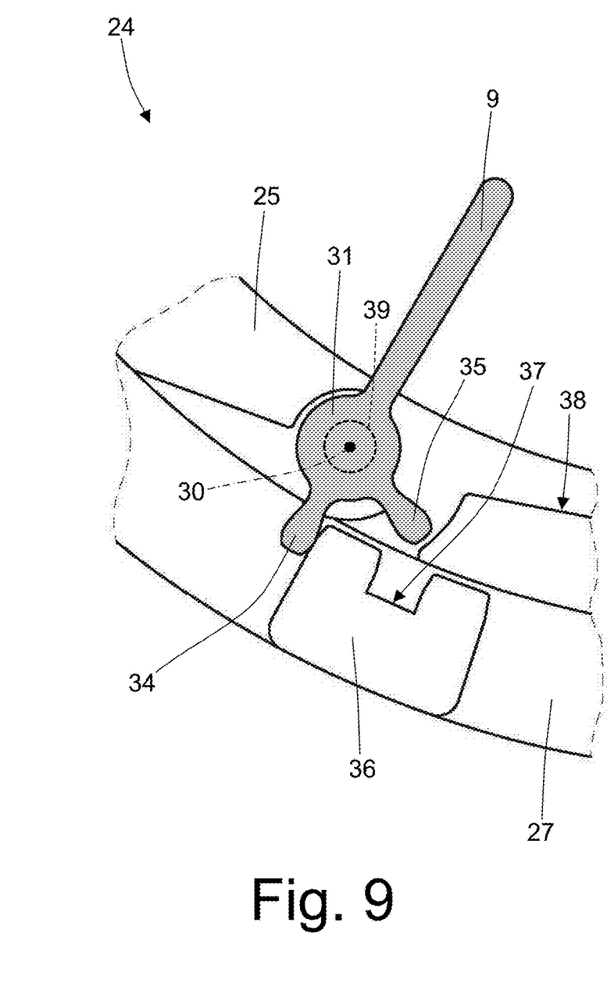
FIGS. 9 and 10 are two detailed views of a pointer of the control panel in FIG. 8 in two different positions.
Figure 10:
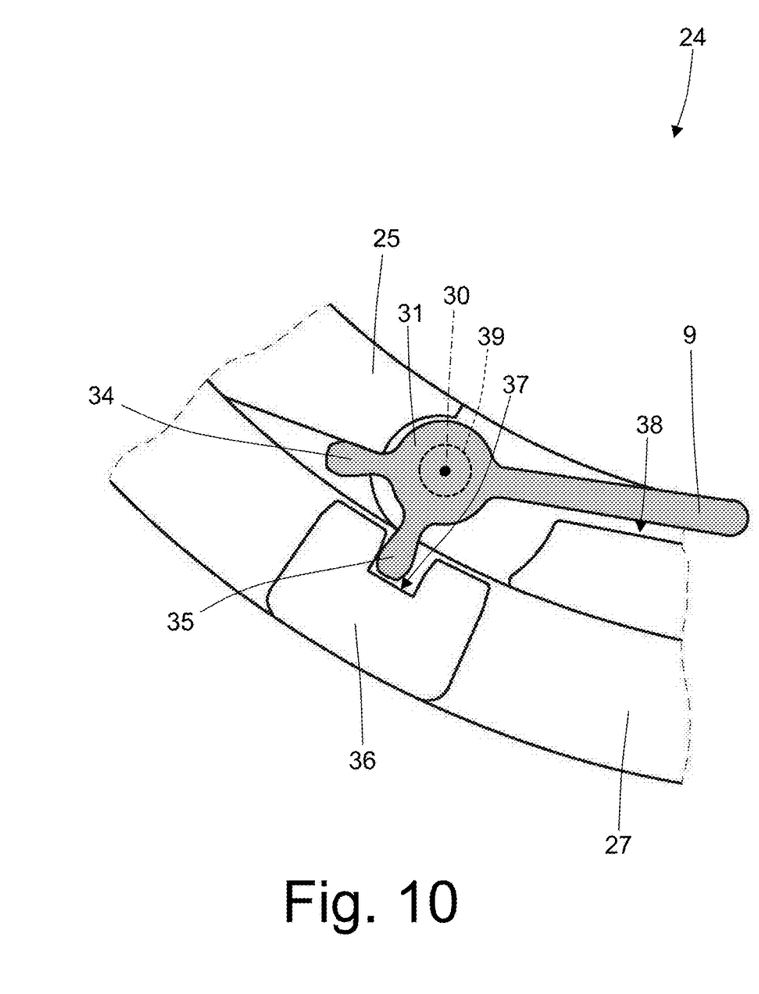

As shown in FIGS. 9 and 10, the pointer 9 is mounted on the support ring 25 so as to rotate, relative to the support ring 25, around the rotation axis 30 (parallel to the rotation axis 26) between an operating position (shown in FIG. 9), in which the pointer 9 is oriented radially (i.e., perpendicularly to the rotation axis 26) and overlaps the secondary digital screen 8 so as to be visible through the through opening 7 of the main digital screen 6, and a rest position (shown in FIG. 10), in which the pointer 9 is oriented circumferentially (i.e., transversely to the rotation axis 26) so as not to overlap the secondary digital screen 8 and, hence, not to be visible through the through opening 7 of the main digital screen 6. In particular, when the pointer 9 is in the rest position (shown in FIG. 10), the pointer 9 is inserted in a seat 38 which is cut into the support ring 25 and is oriented circumferentially.

According to a preferred embodiment, the actuator device 24 comprises a pushing device 39, which is configured to push the pointer 9 towards the operating position (shown in FIG. 9) with a predetermined force, without however preventing the pointer 9 from moving to the rest position (shown in FIG. 10) overcoming the force generated by the pushing device 39. According to a possible embodiment, the pushing device 39 comprises an elastic element (typically a spring working by torsion), which generates an elastic force pushing the pointer 9 towards the operating position (shown in FIG. 9). According to an alternative embodiment, the pushing device 39 comprises two magnets (one housed in the central element 31 and the other arranged in the support ring 25), which are arranged aligned with one another and with opposite polarities when the pointer 9 is in the operating position (shown in FIG. 9), and are perpendicular to one another when the pointer 9 is in the rest position (shown in FIG. 10).

In use, when the appendages 34 and 35 of the central element 31 are spaced from the countering body 36, the force generated by the pushing device 39 keeps the pointer 9 in the operating position (shown in FIG. 9) and thus the pointer 9 is oriented radially and overlaps the secondary digital screen 8 so as to be visible through the through opening 7 of the main digital screen 6; by rotating the support body 25 around the rotation axis 26, the pointer 9 is moved along the secondary digital screen 8 to cooperate with the secondary digital screen 8. Instead, when the rotation of the support body 25 around the rotation axis 26 causes the appendage 34 to hit against the countering body 36, the pointer 9 is forced to rotate around the rotation axis 30 to move from the operating position (shown in FIG. 9) to the rest position (shown in FIG. 10), overcoming the force generated by the pushing device 39 (which tends to hold the pointer 9 in the operating position). The rotation of the pointer 9 around the rotation axis 30 initiated by the impact of the appendage 34 against the countering body 36 continues and brings the appendage 35 into the cavity 37 of the countering body 36, thus ending the rotation of the pointer 9 around the rotation axis 30 and arranging the pointer 9 in the rest position (shown in FIG. 10).

Figure 7:
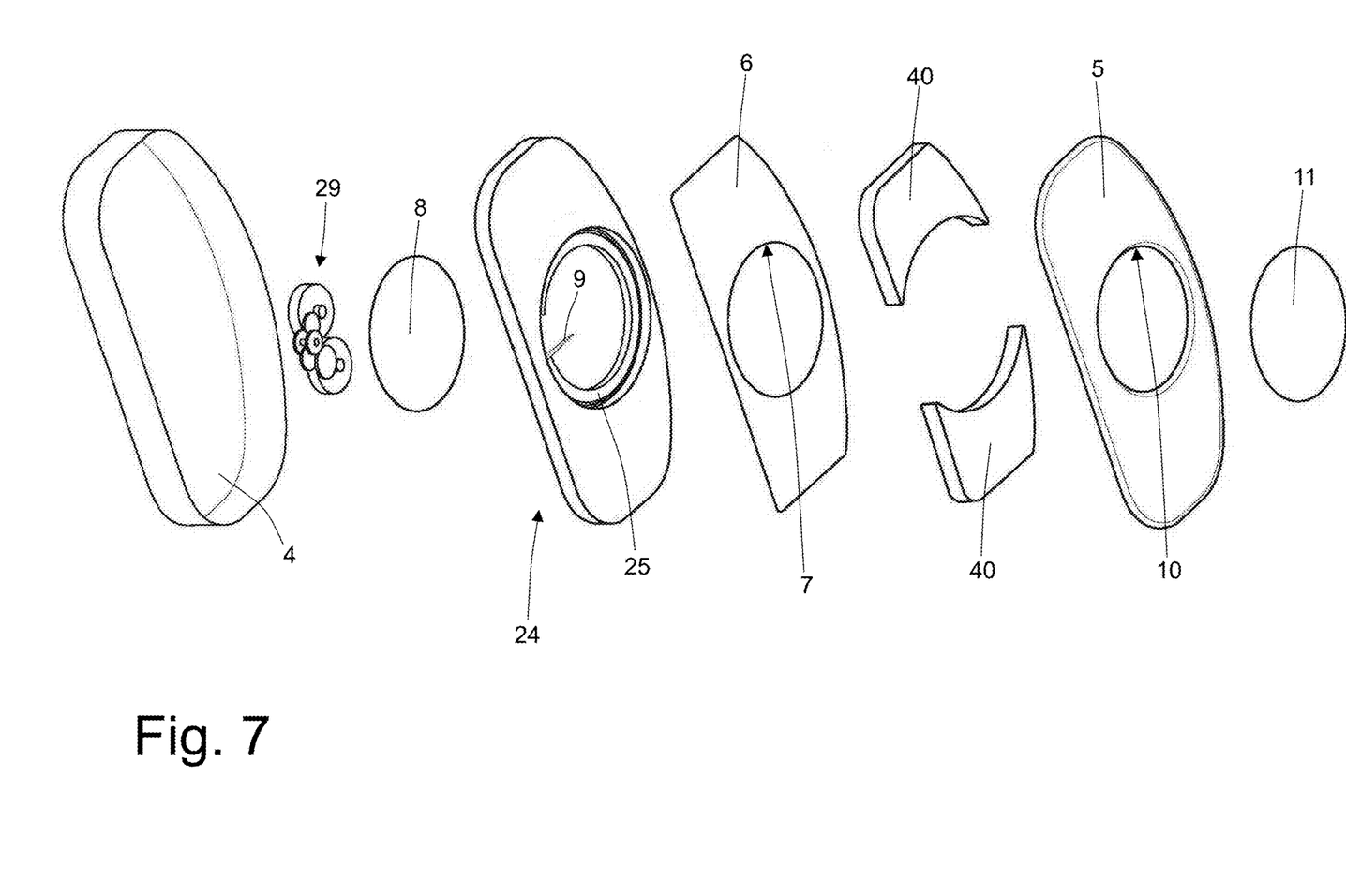
FIG. 7 is a perspective, exploded view of a further embodiment of the control panel.

According to a possible embodiment shown in FIG. 7, two collimated sheets of glass 40 are interposed between the main digital screen 6 and the main transparent panel 5 (i.e., on the main digital screen 6). Each collimated sheet of glass 40 consists of a bundle of parallel optical fibres placed side by side and fused together to form a single indivisible element and has the property of making an image on the bottom of the collimated sheet of glass 40 appear to the human eye as if it were on the top of the collimated sheet of glass 40. That is, looking through a collimated sheet of glass 40 at an image that is on the bottom wall of the collimated sheet of glass 40, the image appears to the human eye as if it were on the top wall of the collimated sheet of glass 40. Essentially, the collimated sheet of glass 40 brings the images closer to the observer without magnifying them.

The purpose of the collimated sheets of glass 40 is to make pieces of information displayed by the main digital screen 6 appear closer to the driver so as to highlight them compared to other pieces of information displayed by the main digital screen 6.

According to other embodiments, not shown, a different number, a different arrangement and/or a different shape of the collimated sheets of glass 40 are envisaged. According to other embodiments, not shown, the collimated sheets of glass 40 also overlap the secondary digital screens 8 or only overlap the secondary digital screens 8.

The embodiments described herein may be combined with each other without departing from the scope of protection of the present invention.

The control panel 2 described above advantageously applies to any type of road vehicle (for instance, a car or a motorcycle) and also to any type of off-road vehicle.

The control panel 2 described above has many advantages.

First of all, the control panel 2 described above allows information to be displayed so that the driver can, in all driving situations, capture the data he/she needs with the least amount of distraction. This result is achieved by the fact that, depending on the driving situation, the information can be displayed in a completely digital form (i.e., without using the pointers 9 and 18 which remain hidden behind the main digital screen 6 and therefore completely invisible to the driver) or in a hybrid form (i.e., partly digitally and partly analogically using the pointers 9 and 18 which are moved on the secondary digital screens 8). In fact, the information displayed in the completely digital form can be more complete and more detailed, whereas the information displayed in the hybrid form is less complete and less detailed but more quickly perceptible (as it is sufficient to see the position of the pointers 9 and 18 without actually reading the numerical scale associated with the pointers 9 and 18). It is important to note that it would also be possible to reproduce the pointers 9 and 18 digitally; however, it has been shown that the visibility of a physical pointer 9 and 18 overlapping a secondary digital screen 8 is far better than the visibility of a pointer displayed by the secondary digital screen 8 (particularly because the physical pointer 9 and 18 overlapping a secondary digital screen 8 creates a three-dimensionality that facilitates viewing the physical pointer 9 and 18 itself).

In other words, the control panel 2 described above allows information to be displayed using only the digital screen 6 and 8 when the driver requires the display of complex information (typically a chart navigator during "cruising" speed) and also allows the pointers 9 and 18 to overlap the secondary digital screens 8 so as to faithfully recreate the appearance (particularly the three-dimensionality) of an analogue instrument when the driver requires this type of instrumentation for a "sporty" driving style. In other words, the control panel 2 described above does not reflect a watered-down compromise between the need of having a large digital screen and the conflicting need of also having a large analogue instrument; in fact, the control panel 2 described above makes it possible to have (at different times) both a large digital screen and an analogue instrument, depending on the driver's wishes.

Furthermore, the control panel 2 described above has particularly small overall dimensions and, hence, can be integrated into any type of vehicle.

Lastly, the control panel 2 described above has a relatively low manufacturing cost as it uses simple components that are easily available on the market.

LIST OF REFERENCE NUMBERS OF THE FIGURES

1 dashboard
2 control panel
3 steering wheel
4 housing body
5 main transparent panel
6 main digital screen
7 through opening
8 secondary digital screen
9 pointer
10 through opening
11 secondary transparent panel
12 actuator device
13 actuator device
14 slide
15 fixed guide
16 worm screw
17 motor
18 pointer
19 actuator device

The invention claimed is:

1. A control panel (2) for a vehicle and comprising:
a main digital screen (6) having at least one through opening (7) made within it and completely surrounded by the main digital screen (6);
at least one secondary digital screen (8), which is arranged behind the main digital screen (6) in the area of the first through opening (7) of the main digital screen (6) so that it is visible through the first through opening (7);
at least one pointer (9, 18), which can be arranged between the main digital screen (6) and the secondary digital screen (8) and is mounted in a movable manner so as to move on the secondary digital screen (8); and
a first actuator device (12, 19) configured to move the pointer (9, 18) on the secondary digital screen (8).

2. The control panel (2) according to claim 1, wherein the secondary digital screen (8) has the same shape and the same size as the first through opening (7) of the main digital screen (6).

3. The control panel (2) according to claim 1, wherein the first through opening (7) of the main digital screen (6) has a circular shape.

4. The control panel (2) according to claim 1 and comprising a main transparent panel (5), which covers the main digital screen (6) and has a second through opening (10) which is arranged in the area of the first through opening (7) of the main digital screen (6) and has the same shape and the same size as the first through opening (7) of the main digital screen (6).

5. The control panel (2) according to claim 4 and comprising a secondary transparent panel (11), which is arranged in the area of the through opening (10) of the main transparent panel (5), covers the secondary digital screen (8) and preferably is not coplanar to the main transparent panel (5).

6. The control panel (2) according to claim 1, wherein the pointer (9, 18) is movable so as to be arranged in the area of the first through opening (7) of the digital screen (6) and, hence, be visible through the first through opening (7) or be arranged beside the first through opening (7) of the digital screen (6) and, hence, not be visible through the first through opening (7).

7. The control panel (2) according to claim 1, wherein the pointer (9, 18) is supported by the first actuator device (12, 19).

8. The control panel (2) according to claim 7, wherein the first actuator device (12) is mounted in a movable manner so as to move between an operating position, in which the pointer (9) overlaps the secondary digital screen (8) and, hence, is visible through the first through opening (7) of the main digital screen (6), and a rest position, in which the pointer (9) is arranged beside the secondary digital screen (8) so as not to be visible through the first through opening (7) of the main digital screen (6).

9. The control panel (2) according to claim 8 and comprising a second actuator device (13) configured to move the first actuator device (12) between the operating position and the rest position.

10. The control panel (2) according to claim 9, wherein:
the first actuator device (12) is mounted on a slide (14), which slides along a fixed guide (15); and
the second actuator device (13) comprises a worm screw (16), which engages a threaded hole made in the slide (14), and a motor (17), which causes the rotation of the worm screw (16).

11. The control panel (2) according to claim 1, wherein the first actuator device (20) transmits the motion to the pointer (9) through a contactless magnetic coupling.

12. The control panel (2) according to claim 11, wherein the first actuator device (12) comprises a slider (21), which is arranged behind the secondary digital screen (8), is aligned with the pointer (9) and magnetically attracts the pointer (9) to itself.

13. The control panel (2) according to claim 12, wherein the slider (21) supports a permanent magnet (22), which is designed to generate a magnetic field to magnetically attract the pointer (9).

14. The control panel (2) according to claim 11, wherein the secondary digital screen (8) is larger than the through opening (7) so that, by placing the pointer (9) on an edge of the secondary digital screen (8), the pointer (9) is not visible through the through opening (7).

15. The control panel (2) according to claim 1, wherein the first actuator device (24) comprises a support ring (25), which is mounted so as to rotate around a first central rotation axis (26) and supports the pointer (9) so that the rotation of the support ring (25) around the first rotation axis (26) also causes the rotation of the pointer (9) around the first rotation axis (26).

16. The control panel (2) according to claim 15, wherein the support ring (25) is arranged between the secondary digital screen (8) and the through opening (7) of the main digital screen (6) so that the pointer (9) carried by the support ring (25) can be arranged on the secondary digital screen (8).

17. The control panel (2) according to claim 15, wherein the support ring (25) has an inner diameter which is greater than an inner diameter of the through opening (7) of the main digital screen (6) so as not to be visible through the through opening (7) and so as not to overlap the part of the secondary digital screen (8) visible through the through opening (7).

18. The control panel (2) according to claim 15, wherein:
an annular rack (28) is present within the support ring (25); and
the actuator device (24) comprises a motor (29), which causes the rotation of a gear wheel meshing with the annular rack (28).

19. The control panel (2) according to claim 15, wherein the first actuator device (24) comprises a containing ring (27), which is fixed and coaxial to the support ring (25) and houses, on the inside, the support ring (25) so that the support ring (25) is free to slide relative to the containing ring (27).

20. The control panel (2) according to claim 15, wherein the pointer (9) is mounted on the support ring (25) so as to rotate, relative to the support ring (25), around a second rotation axis (30) parallel to the first rotation axis (26) between an operating position, in which the pointer (9) is oriented radially and overlaps the secondary digital screen (8) so as to be visible through the through opening (7) of the main digital screen (6), and a rest position, in which the pointer (9) is oriented circumferentially so as not to overlap the secondary digital screen (8) and, hence, not to be visible through the through opening (7) of the main digital screen (6).

21. The control panel (2) according to claim 20, wherein the support ring (25) has a seat (38), which is oriented circumferentially and is configured to accommodate the pointer (9) in the rest position.

22. The control panel (2) according to claim 20, wherein the actuator device (24) comprises a pushing device (39), which is configured to push the pointer (9) towards the operating position with a predetermined force, without preventing the pointer (9) from moving to the rest position overcoming the force generated by the pushing device (39).

23. The control panel (2) according to claim 22, wherein the pushing device (39) comprises an elastic element, which generates an elastic force pushing the pointer (9) towards the operating position.

24. The control panel (2) according to claim 22, wherein the pushing device (39) comprises two magnets, which are—one—integral to the pointer (9) and—the other—integral to the support ring (25), are arranged aligned with one another and with opposite polarities when the pointer (9) is in the operating position, and are perpendicular to one another when the pointer (9) is in the rest position.

25. The control panel (2) according to claim 20, wherein:
a central element (31) is provided, which is mounted in a rotary manner on the support ring (25) and from which both the pointer (9) and at least one appendage (34, 35) arranged on the opposite side relative to the pointer (9) radially protrude; and
a countering body (36) is provided, which is arranged so as to hit against the appendage (34, 35) during the rotation of the support ring (25), so as to push the pointer (9) towards the rest position.

26. The control panel (2) according to claim 25, wherein:
two appendages (34, 35) are provided, which radially project from the central element (31) and are arranged on the opposite side relative to the pointer (9); and
the countering body (36) has a cavity (37), which is open towards the centre and is shaped so as to contain, on the inside, an appendage (35).

27. The control panel (2) according to claim 1, wherein:
the main digital screen (6) comprises three first through openings (7) arranged side by side;
three secondary digital screens (8) are provided, each arranged behind the main digital screen (6) in the area of a corresponding first through opening (7) of the main digital screen (6); and
a first through opening (7) arranged at the centre has a greater size than the sizes of the other two first through openings (7) arranged at the ends.

* * * * *